Patented Oct. 25, 1949

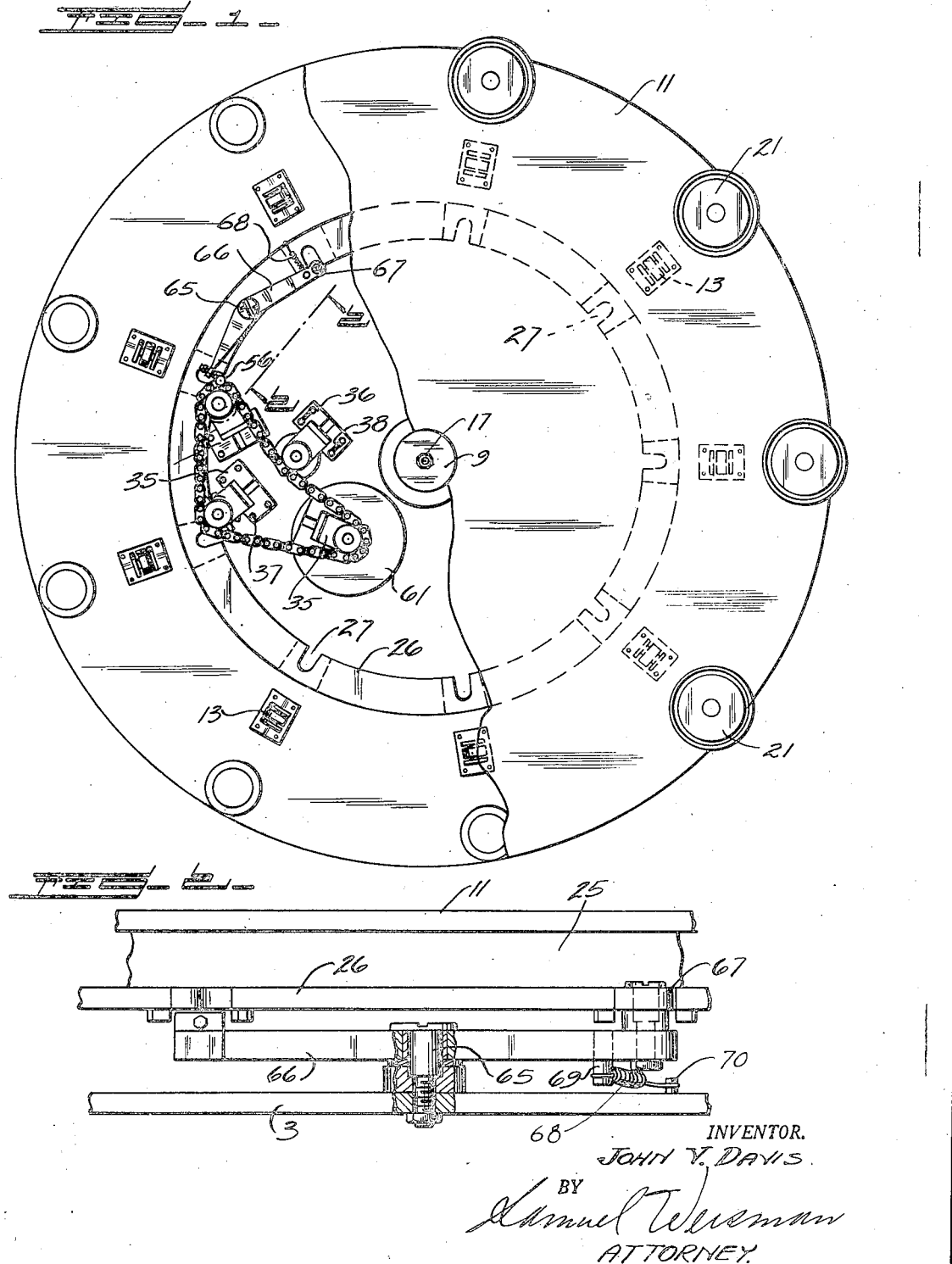

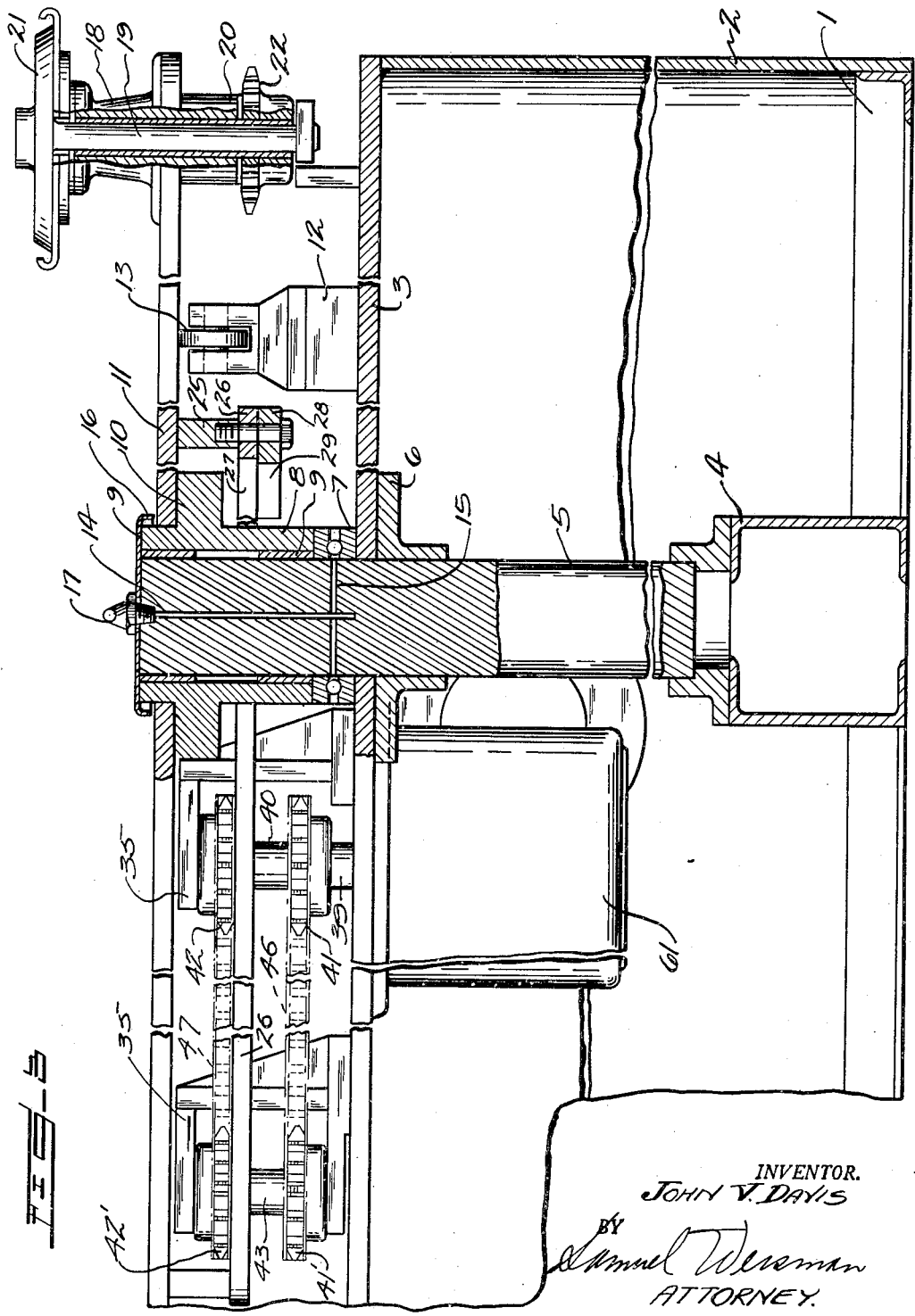

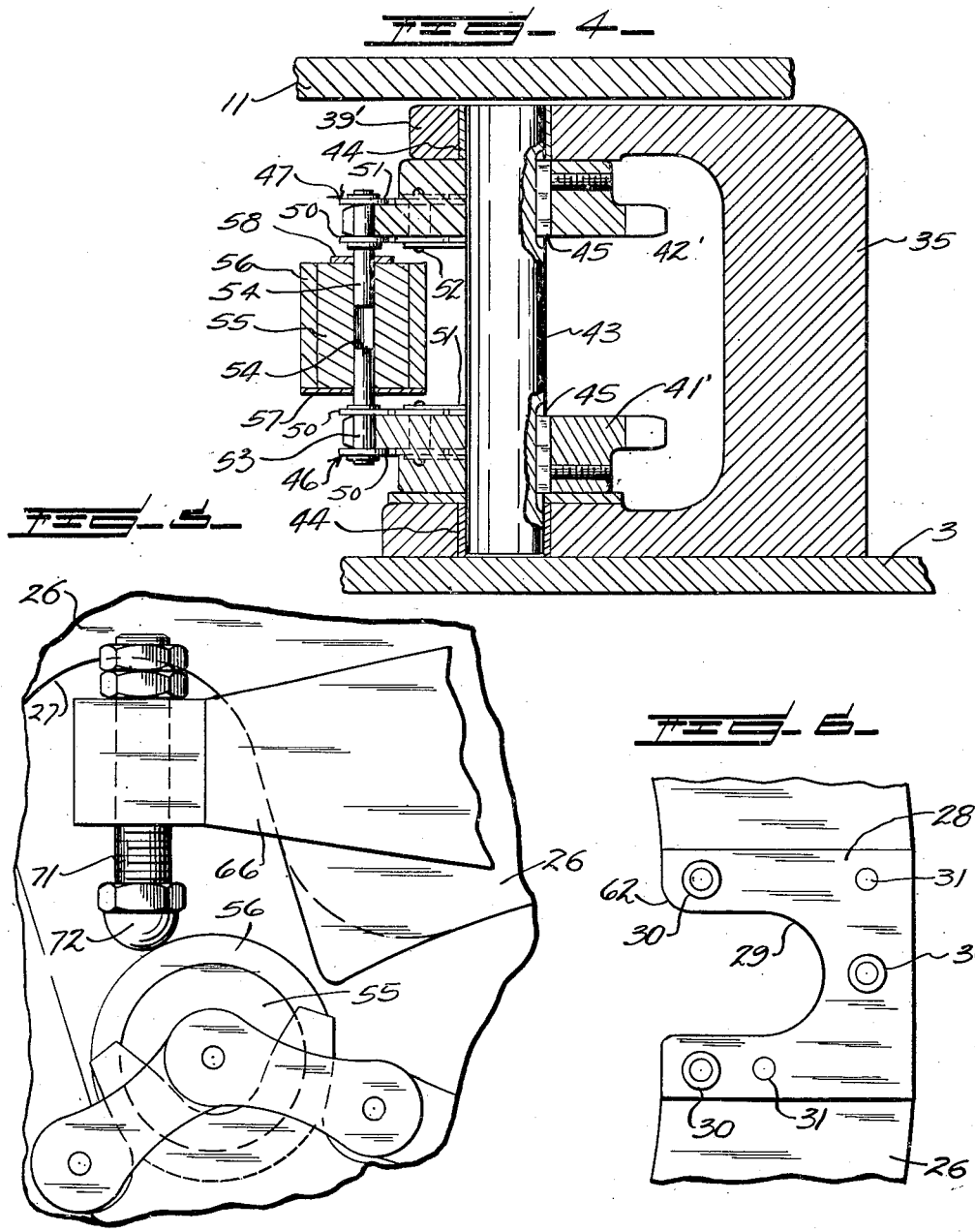

2,486,128

UNITED STATES PATENT OFFICE 2,486,128

INTERMITTENT MOVEMENT

John V. Davis, Detroit, Mich., assignor to The Udylite Corporation, Detroit, Mich., a corporation of Delaware Application April 13, 1946, Serial No. 662,055

2 Claims. (Cl. 74—436)

The present invention pertains to a novel intermittent movement designed especially, but not exclusively, for rotary work tables. The principal object of the invention is to provide an intermittent movement of the lock-and-pin type having the pin carrier disposed internally of a slotted driven ring and constructed in such a manner as to enable a high ratio of dwell time to index time and a favorable angle of pin entrance and departure with respect to the slots of the driven member.

In the disclosed construction the intermittently driven ring is fixed to the rotary work table which in turn supports nine work fixtures spaced 40° apart. This number is merely representative but illustrates the desirability of a high ratio of dwell time to index time.

Ordinarily the pin carrier has a fixed center and travels in a circle. Such a device, in conjunction with an internally slotted ring, would produce an unfavorable angle of pin entrance and departure or, to avoid this, would require a complex mechanical structure.

The stated objects of the invention are accomplished by the use of a chain, rather than a fixed radius member, as the carrier for the pin. The chain is easily disposed within the inner circumference of the driven ring without interfering with other parts of the apparatus. The chain travels over a series of sprocket wheels, and the positioning of these wheels is critical only at the two points where the drive member enters a slot and emerges therefrom. At these points the two wheels are so related to the driven ring that the driving member enters a slot and emerges therefrom at an angle that does not produce injurious acceleration and deceleration of the ring. Elsewhere the chain may be mounted to follow any given path which is compatible with the general design of the machine. The length of the chain is such as to produce the desired ratio of dwell time to transfer or index time, and a high degree of adjustability in this respect is obtainable in the determination of the length of the carrier chain without affecting the entrance and departure angles of the driving member into the slots of the driven member. Specifically, the ratio is increased by lengthening the chain and decreased by shortening the chain. Also, the entrance and departure angles of the driving member may be altered by regulating the aforementioned two central points without necessarily changing the chain length.

Another object of the invention is to provide a device for positively holding the rotary table in a fixed position during the dwell interval. This device comprises a rocker arm having a fixed given point and carrying at one end a roller which is normally drawn into one of the slots of the driven ring. The other end of the rocker arm lies at the position where the driving member enters a slot and is actuated by the driving member to withdraw the locking member at the other end and thus permit rotation of the ring. When the indexing movement has been completed, the locking member again enters a slot under the action of the spring attached thereto, so that the ring is locked positively until the next indexing action begins.

The invention is fully disclosed by way of example in the following description and in the accompanying drawings in which:

Figure 1 is a plan view of the machine, partly broken away;

Figure 2 is a fragmentary side elevation, partly in section;

Figure 3 is a vertical section, partly in elevation;

Figure 4 is a detail vertical section;

Figure 5 is an enlarged detail of Figure 1, and

Figure 6 is an enlarged detail of the slotted ring.

Reference to these views will now be made by use of like characters which are employed to designate corresponding parts throughout.

The machine is built upon a fixed base in the form of a housing comprising a bottom rail 1, a cylindrical wall 2 and a horizontal flat top 3. In the center of the bottom rail is mounted a small base 4 for supporting the lower end of a column 5 which extends through the center of the top 3 and a short distance above it. The post 5 carries a collar 6 on which rests the center of the top 3.

The exposed upper end of the post 5 centers a rotary table. For this purpose a thrust bearing 7 surrounds the exposed upper end of the post 5 and rests upon the top 3, and a sleeve 8 surrounding the exposed end of the post rests upon the thrust bearing. Suitable sleeve bearings 9 are inserted between the sleeve 8 and the post. The sleeve 8 has a collar 10 on which rests a rotary table 11 which is centered on the upper end of the post. For additionally supporting the table 11, a suitable number of bifurcated brackets 12 are mounted in a circular series upon the fixed top 3, each such bracket supporting a roller 13 engaging the lower surface of the table 11. A lubricating passage 14 is drilled axially from the upper extremity of the post 5 to the lower plane of the thrust bearing 7, and radial passages 15 are formed in the post in the central plane of the thrust bearing to communicate with the passage 14. A cap 16 is laid upon the upper end of the post and secured by a lubricating fitting 17 which communicates with the axial passage 14.

The rotary table 11 carries a number of fixtures spaced equally in a circle having its center in the axis of the post 5. Each fixture includes a spool or bearing 18 secured upon the table 11 and having a shaft 19 journalled therein. Each shaft 19 extends below the table 11 through another bearing 20 secured to the lower surface of the table. The upper end of each shaft 19 carries a work-supporting plate 21 above the bearing 18, and the lower end carries a sprocket wheel 22 below the bearing 20. The wheel 22 is driven by any suitable means which need not be disclosed herein.

To the lower surface of the rotary table 11 is secured a suspension ring 25 centered on the axis of the post 5. The ring 25 serves to support a drive ring 26. The latter is slotted radially from its inner circumference at equal intervals, as indicated by the numeral 27, to receive an intermittent driving member which will presently be described. At each slot 27 a hardened wear plate 28 is secured to the lower surface of the ring 26. Each plate 28 is formed with a slot 29 coinciding substantially with a slot 27 and slightly smaller. The attachment of each plate 28 may be made by means of screws 30 at opposite sides of the slot 29 and another beyond the closed end of the slot. These screws extend into the suspension ring 25 so that they also support the drive ring 26. Dowels 31 may also be passed through the plates 28 into the rings 26 and 25 for locating purposes.

On the fixed housing top 3, between the post 5 and the inner circumference of the ring 26, are mounted a series of three brackets 35 and a fourth bracket 36. Two of the brackets 35 are mounted close to the ring 26 for a purpose presently to be described. All the brackets 35 are fixed to the top 3 by suitable means such as bolts 37. The bracket 36 differs only that its fastening bolts are received in slots 38 so that the position of the bracket is adjustable.

Each bracket 35, 36 includes a pair of spaced horizontal arms 39'. The bracket 35 nearest the post 5 supports a pair of vertically alined stub shafts 39 and 40 on which are mounted sprocket wheels 41 and 42 disposed respectively below and above the ring 26. The arms 39' of the remaining brackets support single shafts 43 carrying sprockets wheels 41' and 42' disposed respectively in the planes of the wheels 40 and 41. Each shaft may be journalled in sleeve bearings 44, and the several sprocket wheels are secured by keys 45. A double link sprocket chain 46 is passed around the wheels 41, 41' of the brackets 35, and a coinciding similar chain 47 is passed around the remaining wheels of the same brackets. The sprocket wheels of the adjustable bracket 36 bear outwardly on the chains and serve as idlers maintaining the tension of the chains.

Each sprocket chain includes two sets of parallel links 50 straddled and connected by two sets of intermediate links 51. The articulations are made by pins 52, and each pin is surrounded by a roller 53 between the parallel links 50 to serve as spacers and to be engaged by the teeth of the sprocket wheels.

One pair of alined pins is extended at 54 and made common to both chains 46, 47. On the extensions is mounted a cylindrical bearing 55 on which in turn is rotatably mounted a sleeve or roller 56 so located and dimensioned as to enter the slots 29 of the wear plates 28. The bearing 55 and roller 56 are retained at the ends by suitably shaped plates 57 and 58 mounted on the extensions 54.

The two brackets 35 that are located close to the ring 26 are mounted so that their respective sprocket wheels have their circumferences spaced apart, on the outward side of both centers and preferably on a center line, a distance equal to the axial distance between two adjacent slots 29 of the plates 28.

The stub shaft 39 is driven by any suitable means such as a gear box or reducer 61. The lower chain 46 is thereby driven and in turn rotates the shaft 54 and the sprocket wheels 42, 42' to propel the chain 47 and roller 56 concurrently with the lower chain 46.

From the aforementioned relation of the ring 26 to the two brackets 35 nearest thereto, it is now apparent, on counterclockwise movement of the sprocket chains, the roller 56 enters a given slot 29, indexes the ring 26 until the roller moves out of the slot, and leaves the ring stationary until the roller returns to the slot-entering position. The slots 27 and 29 are rounded at the mouth and on the trailing side to facilitate entrance of the roller 56. The ring 26, of course, drives the rotary table 11 from which it is suspended. While the roller 56 travels from one slot to the next in the non-driving portion of its movement, the table 11 remains stationary and permits an operation to be performed at one of the fixtures 21.

In an intermittent apparatus of the slot-and-pin type it is desirable that the pin enter the slot at an angle not varying greatly from 90° to the radius of the pin carrier at the entrance of the slot in order to maintain at a minimum the starting movement or initial acceleration of the slotted member. A similar condition is desirable on departure of the pin from the slot in order to reduce the deceleration of the slotted member. In a Geneva movement, this condition is realized by means of a star wheel having four radial slots spaced 90° apart. In such case the index or transfer interval is 90°, so that the ratio of dwell time to index time is 3:1. If a relatively longer dwell time is desired, it is obtained by the provision of more slots which result in an unfavorable angle of pin entrance and departure and hence abrupt acceleration and deceleration.

In the herein described apparatus, a high ratio of dwell time to index time is realized without introducing an unfavorable angle of pin entrance and departure. This result is realized by the provision of a chain carrier for the pin as distinguished from a disk or wheel carrier.

An internal drive, such as that disclosed here, with a disk carrier would involve a complicated construction and unfavorable angles of entrance and departure. The chain drive, on the other hand, requires no constant radius throughout but only at selected points. Consequently, the configuration of the chain carrier is readily adjustable within the size limitations of the apparatus to modify the entrance and departure angles and the acceleration and deceleration as desired. It is also evident that the chain carrier enables further increasing the ratio of dwell time to transfer time by lengthening the chain without distributing the entrance and departure angles.

There is also provided a mechanism for positively holding the rotary table 11 at rest during the dwell period. This device includes a post 65 suitably secured to the fixed top 3 and having a rocker arm 66 mounted thereon between the top 3 and the slotted ring 26. The ends of the rocker arm extend to two adjacent slots 29, one of these slots being that which the roller 56 enters and the other slot being next adjacent thereto in the direction counter to the movement of the ring. At the latter end, the arm 66 carries a roller 67 adapted to enter the immediately adjacent slot. In fact the roller is normally drawn into the last named slot by means of a tensioned coil spring 68 having its ends anchored respectively in a pin 69 carried by the arm and a similar pin 70 mounted on the fixed member 3. In the inserted position the roller 67 serves as a stop for the ring 26 and the rotary table 11.

The other end of the arm 66 carries a horizontal stud 71 having a spherical head 72 engageable by the roller 56 as the latter enters a slot 29. In this movement the arm 66 is rocked and the roller 67 is moved out of its slot to permit rotation of the ring 26 by the roller 56, while the roller merely engages the inner circumference of the moving ring. When the roller 56 has reached the end of its driving movement and is about to pass out of the slot 29, the roller 67 is in register with another slot 29 and is drawn into it by the spring 68.

Although a specific embodiment of the invention has been illustrated and described, it will be understood that various alterations in the details of construction may be made without departing from the scope of the invention as indicated by the appended claims.

What I claim is:

1. An intermittent movement comprising a rotatably supported ring having a plurality of spaced slots extending outward from its inner circumference, an articulated endless chain comprising pin-connected links mounted substantially within the inner circumference of said ring, means for driving said chain, said chain having a portion of its length overlapping a surface of said ring, said portion having its ends coinciding substantially with two points of the inner circumference of said ring and spaced apart the distance between two of said slots, a driving member carried by and co-axial with one of said pins and movable in the path of travel of said pins and links of said chain, said driving member being adapted to enter one of said slots on entering said portion and to depart from said slot on departing from said portion.

2. An intermittent movement comprising a rotatably supported ring having a plurality of spaced slots extending outward from its inner circumference, a pair of coinciding endless chains mounted substantially within the inner circumference of said ring, means for driving said chains, each chain comprising pin-connected links and having a portion of its length overlapping opposite surfaces of each ring, each said portion having its ends coinciding substantially with two points of the inner circumference of said ring and spaced apart the distance between two of said slots, a driving member carried by and co-axial with one of said pins and movable in the path of travel of said pins and links of said chain, said driving member being adapted to enter one of said slots on entering said portions and to depart from said slot on departing from said portions.

JOHN V. DAVIS.

REFERENCES CITED

The following references are of record in the file of this patent:

UNITED STATES PATENTS

| Number | Name | Date |
| --- | --- | --- |
| 1,277,183 | Brandenstein | Aug. 27, 1918 |
| 1,336,304 | Leumann | Apr. 6, 1920 |
| 1,347,492 | Brandenberg | July 27, 1920 |
| 1,650,512 | Guena | Nov. 22, 1927 |
| 1,775,029 | Hippenmeyer | Sept. 2, 1930 |
| 1,796,391 | Owen | Mar. 17, 1931 |
| 1,839,312 | Heidman | Jan. 5, 1932 |
| 1,845,476 | Blohm | Feb. 16, 1932 |
| 2,281,305 | Hannon | Apr. 28, 1942 |
| 2,394,467 | Muller | Feb. 5, 1946 |
| 2,404,156 | Abbott | July 16, 1946 |